(12) United States Patent
Fournel

(10) Patent No.: US 9,598,301 B2
(45) Date of Patent: Mar. 21, 2017

(54) TEMPERATURE CONTROL OF GLASS RIBBONS DURING FORMING

(71) Applicant: Corning Incorporated, Corning, NY (US)

(72) Inventor: Olivier Fournel, Yerres (FR)

(73) Assignee: Corning Incorporated, Corning, NY (US)

( * ) Notice: Subject to any disclaimer, the term of this patent is extended or adjusted under 35 U.S.C. 154(b) by 398 days.

(21) Appl. No.: 13/662,783

(22) Filed: Oct. 29, 2012

(65) Prior Publication Data

US 2013/0133368 A1 May 30, 2013

Related U.S. Application Data

(60) Provisional application No. 61/564,396, filed on Nov. 29, 2011.

(51) Int. Cl.
*C03B 17/06* (2006.01)

(52) U.S. Cl.
CPC .......... *C03B 17/067* (2013.01); *C03B 17/064* (2013.01)

(58) Field of Classification Search
CPC ........................... C03B 17/064; C03B 17/067
USPC ........................................ 65/53, 84, 85, 204
See application file for complete search history.

(56) References Cited

U.S. PATENT DOCUMENTS

| 3,301,650 A | 1/1967 | Ward |
| 3,338,696 A | 8/1967 | Dockerty |
| 3,410,672 A | 11/1968 | De Lajarte |
| 3,682,609 A | 8/1972 | Dockerty |
| 6,715,323 B1 * | 4/2004 | Roba et al. ...................... 65/434 |
| 7,207,193 B2 | 4/2007 | Xun et al. |
| 8,037,716 B2 | 10/2011 | Aniolek et al. .................... 65/95 |
| 8,136,371 B2 | 3/2012 | Kato et al. |
| 8,322,160 B2 | 12/2012 | Nishiura et al. |
| 8,429,936 B2 | 4/2013 | Allan et al. |
| 2006/0042314 A1 | 3/2006 | Abbott, III et al. ........... 65/25.3 |
| 2010/0218557 A1 | 9/2010 | Aniolek et al. |
| 2010/0281920 A1 | 11/2010 | Nishiura et al. |
| 2011/0126591 A1 * | 6/2011 | Chalk et al. ...................... 65/84 |

FOREIGN PATENT DOCUMENTS

GB          1154153          6/1969

OTHER PUBLICATIONS

International Searching Authority; International Search Report; Mailing Date: Feb. 12, 2013; pp. 1-2.

(Continued)

*Primary Examiner* — Queenie Dehghan

(57) ABSTRACT

A method of cooling a glass ribbon formed using a fusion draw process. The method includes forming a glass ribbon using the fusion draw process. The glass ribbon, once formed, passes vertically through a glass transition temperature region. The glass ribbon is directed through a protective plenum at least partially located in a bottom of the draw region. A gas is directed into the protective plenum and vertically along a broad surface of the glass ribbon. The gas is directed out of the protective plenum through at least one outlet slot formed through a sidewall of the protective plenum at no less than about 100 $Nm^3/h$.

10 Claims, 5 Drawing Sheets

(56) References Cited

OTHER PUBLICATIONS

The State Intellectual Property Office of The People's Republic of China; Notice on the First Office Action; Date of Dispatch: Nov. 30, 2015; pp. 1-5.
Austrian Patent Office; SG11201402733V Search Report Dated Apr. 17, 2015; 1 Pg.
JP2014544827 Office Action Dated Oct. 25, 2016, Japan Patent Office.

* cited by examiner

TEMPERATURE CONTROL OF GLASS RIBBONS DURING FORMING

This application claims the benefit of priority under 35 USC §119 of U.S. Provisional Application Ser. No. 61/564,396 filed on Nov. 29, 2011 the content of which is relied upon and incorporated herein by reference in its entirety.

FIELD

The present specification generally relates to manufacture of glass sheets used as substrates in display devices, and more particularly, to methods and apparatus for controlling temperature of glass ribbons during their formation.

BACKGROUND

Display devices are used in a variety of applications. For example, thin film transistor liquid crystal displays (TFT-LCDs) are used in notebook computers, flat panel desktop monitors, LCD televisions, and internet and communication devices, to name only a few.

Many display devices, such as TFT-LCD panels and organic light-emitting diode (OLED) panels, are made directly on flat glass sheets (glass substrates). To increase production rates and reduce costs, a typical panel manufacturing process simultaneously produces multiple panels on a single substrate or a sub-piece of a substrate. At various points in such processes, the substrate is divided into parts along cut lines.

One such process for forming glass sheets is commonly referred to as the fusion draw process. The fusion process, specifically, the overflow downdraw fusion process, includes a supply pipe, known as an isopipe, which provides molten glass to a collection trough formed in a refractory body. During the overflow downdraw fusion process, molten glass passes from the supply pipe to the trough and then overflows the top of the trough on both sides, thus forming two sheets of glass that flow downward and then inward along the outer surfaces of the isopipe. The two sheets meet at the bottom or root of the isopipe, where they fuse together into a single sheet. The single sheet is then fed to drawing equipment that controls the thickness of the sheet by the rate at which the sheet is drawn away from the root. The drawing equipment is located well downstream of the root so that the single sheet has cooled and become rigid before coming into contact with the equipment.

As the fusion draw process is well-suited for forming high quality glass sheets, its use in markets other than LCD is desired. Examples include chemically strengthened glass and specialty glass for use in photovoltaic panels. Such glass sheets may have their own controlled cooling concerns during formation.

SUMMARY

In one embodiment, a method of cooling a glass ribbon formed using a fusion draw process. The method includes forming a glass ribbon using the fusion draw process. The glass ribbon, once formed, passes vertically through a glass transition temperature region. The glass ribbon is directed through a protective plenum at least partially located in a bottom of the draw region. A gas is directed into the protective plenum and vertically along a broad surface of the glass ribbon. The gas is directed out of the protective plenum through at least one outlet slot formed through a sidewall of the protective plenum at no less than about 100 Nm³/h.

In another embodiment, a method of cooling a glass ribbon formed using a fusion draw process is provided. The method includes forming a glass ribbon using the fusion draw process. The glass ribbon, once formed, passes vertically through a glass transition temperature region. The glass ribbon is directed through a protective plenum at least partially located in a bottom of the draw region. After the glass ribbon cools below its glass transition temperature, then a gas is directed into the protective plenum and vertically along a broad surface of the glass ribbon to further cool the glass ribbon. The gas is directed out of the protective plenum through at least one outlet slot formed through a sidewall of the protective plenum.

In another embodiment, a method of cooling a glass ribbon formed using a fusion draw process is provided. The method includes forming a glass ribbon using the fusion draw process. The glass ribbon, once formed, passes vertically through a glass transition temperature region. The glass ribbon is directed through a protective plenum at least partially located in a bottom of the draw region. After the glass ribbon cools below its glass transition temperature, then a gas is directed into the protective plenum through a bottom opening in the protective plenum through which the glass ribbon passes to further cool the glass ribbon. The gas is directed out of the protective plenum through at least one pair of outlet slots including a first outlet slot formed through a sidewall of the protective plenum facing a first broad surface of the glass ribbon and a second outlet slot formed through a sidewall of the protective plenum facing a second, opposite broad surface of the glass ribbon.

Additional features and advantages of the claimed subject matter will be set forth in the detailed description which follows, and in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Embodiments described herein generally relate to glass sheet formation including the controlled cooling of a glass ribbon used in forming the glass sheets, for example, during the fusion draw process. Forced convection may be applied in a fusion draw machine. In particular, air or other fluid may enter the fusion draw machine through a bottom opening, for example, where the glass ribbon leaves the fusion draw machine. The heated air may then be forced or otherwise directed out through dedicated openings provided in the fusion draw machine thereby creating air flow that is used to cool the glass ribbon.

The following discussion is in terms of a fusion draw process (also known as a fusion process, an overflow downdraw process, or an overflow process), it being understood that the methods and apparatus disclosed and claimed herein may also applicable to other downdraw processes. As there are known fusion draw processes, various details are omitted so as to not obscure the description. For example, fusion draw processes are described in U.S. Pat. No. 3,682,609 and U.S. Pat. No. 3,338,696, the details of which are hereby incorporated by reference in their entirety.

Figure 1:
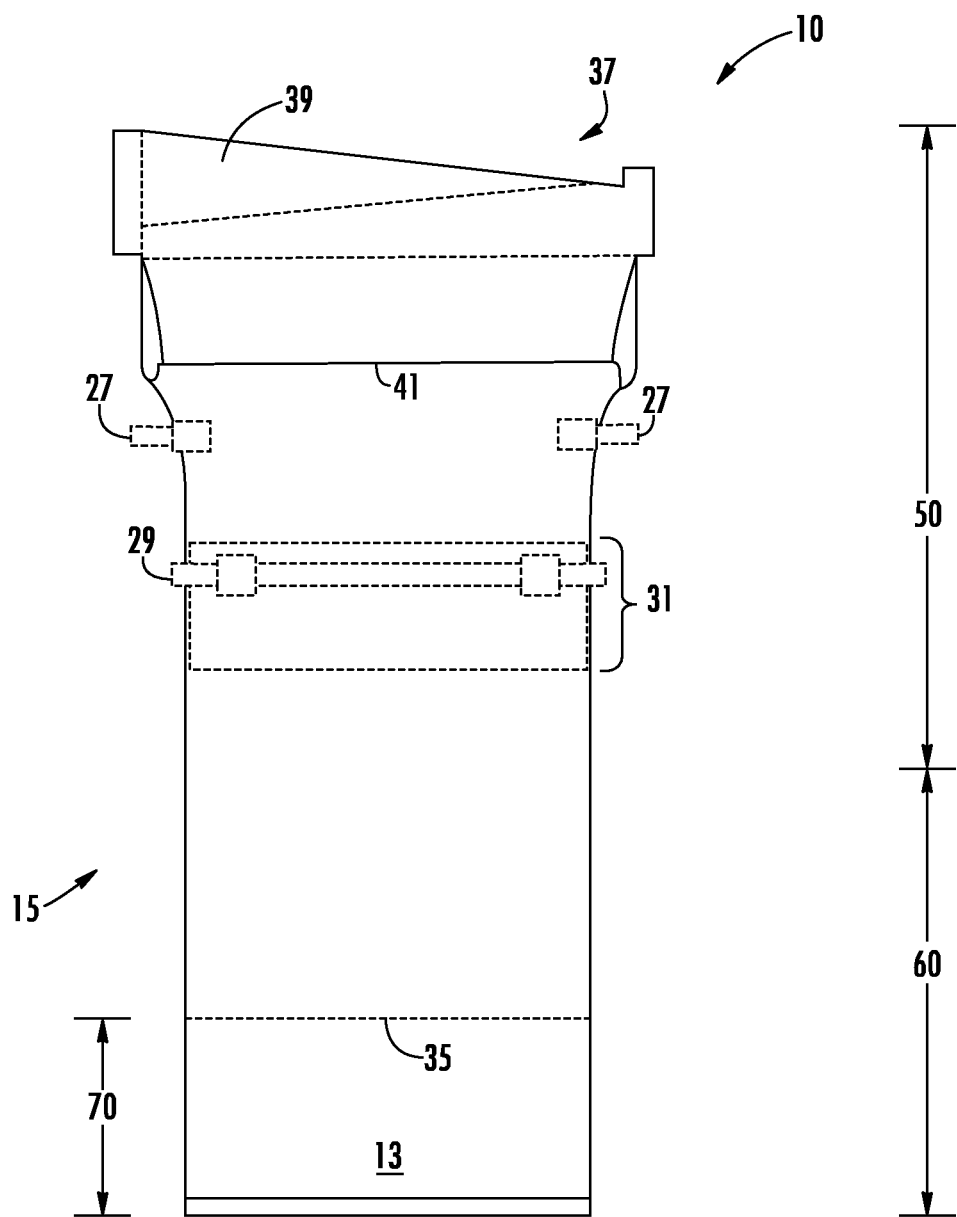
FIG. 1 is a schematic illustration of an embodiment of a fusion draw process.

As shown in FIG. 1, a fusion process 10 employs a forming structure (isopipe) 37, which receives molten glass in a cavity 39. The isopipe includes root 41 where molten glass from the isopipe's two converging sides join together to form glass ribbon 15. After leaving the root, the glass ribbon 15 first traverses edge rollers 27 and then pulling rolls 29. As the glass ribbon 15 moves down the draw, the glass ribbon 15 passes through its glass transition temperature region (GTTR), shown schematically at 31 in FIG. 1. At temperatures above the GTTR, the glass ribbon 15 behaves basically like a viscous liquid. At temperatures below the GTTR, the glass ribbon 15 behaves basically like an elastic solid. As the glass ribbon 15 cools from a high temperature through its GTTR, the glass ribbon 15 does not show an abrupt transition from viscous to elastic behavior. Instead, the viscosity of the glass ribbon 15 gradually increases, and goes through a visco-elastic regime where both viscous and elastic responses are noticeable, and eventually it behaves as an elastic solid.

Although the GTTR will vary with the particular glass being processed, as representative values for LCD glasses, the upper end of the GTTR is typically less than or equal to about 850° C. and the lower end of the GTTR is typically greater than or equal to about 650° C., e.g., the lower end of the GTTR can be greater than or equal to about 700° C.

Edge rollers 27 contact the glass ribbon 15 at a location above the GTTR in FIG. 1, while pulling rolls 29 are shown as being located within the GTTR. Pulling rolls can also be located below the GTTR, if desired. The temperature of the edge rollers 27 may be below that of the glass ribbon 15 at their point of contact, for example, the edge rollers 27 may be water or air cooled. As a result of this lower temperature, the edge rollers 27 may locally reduce the temperature of the glass ribbon 15. This cooling can reduce the attenuation of the glass ribbon 15, i.e., the local cooling can help control the reduction in the ribbon's width that occurs during drawing (e.g., through the action of pulling rolls 29). Pulling rolls 29 may also be generally cooler than the glass ribbon 15 they contact, but because the pulling rolls 29 are located further down the draw, the difference in temperature can be less than at the edge rollers 27.

As shown in FIG. 1, the apparatus used in the fusion process can be divided into a first section 50 (also referred to herein as the Fusion Draw Machine or FDM) and a second section 60 (also referred to herein as the Bottom of the Draw or BOD). In the first section 50, the glass ribbon 15 is relatively viscous, as indicated above, and the glass ribbon 15 may be cooled at a relatively high rate at temperatures above the glass transition region 31, illustratively in a range of approximately 6° C./in. to approximately 15° C./in. This region may be approximately 10 inches to 15 inches from the root 41. Next, at the upper portion of the glass transition region 31, the rate of cooling may be reduced to in the range of approximately 4° C./in. to approximately 10° C./in. This slower cooling rate may be continued for the next approximately 10 inches and approximately 15 inches. It is noted that the cooling rate in this first section 50 before and after root 14 may be controlled by adjusting heating/cooling power to the glass ribbon surface.

The temperature control methods and apparatus described herein relate to cooling of the glass ribbon 15 in the second section 60 located below the glass transition region 31. The BOD or second section 60 also includes a section 70 (also referred to herein as the Travelling Anvil Machine or TAM), where individual sheets 13 are separated from ribbon 15 along score line 35. Temperature control in this second section 60 may be achieved by providing a protective plenum enclosing the glass ribbon 15. The protective plenum may include walls including relatively low heat conducting materials and incorporation of electrical heating elements to tune the glass temperature profile. Heat may be extracted from the glass ribbon 15, at least in part, by radiative heat transfer from the glass ribbon 15 to the walls of the protective plenum, conductive heat transfer through the walls and convection from the walls to the external environment.

Figure 2:
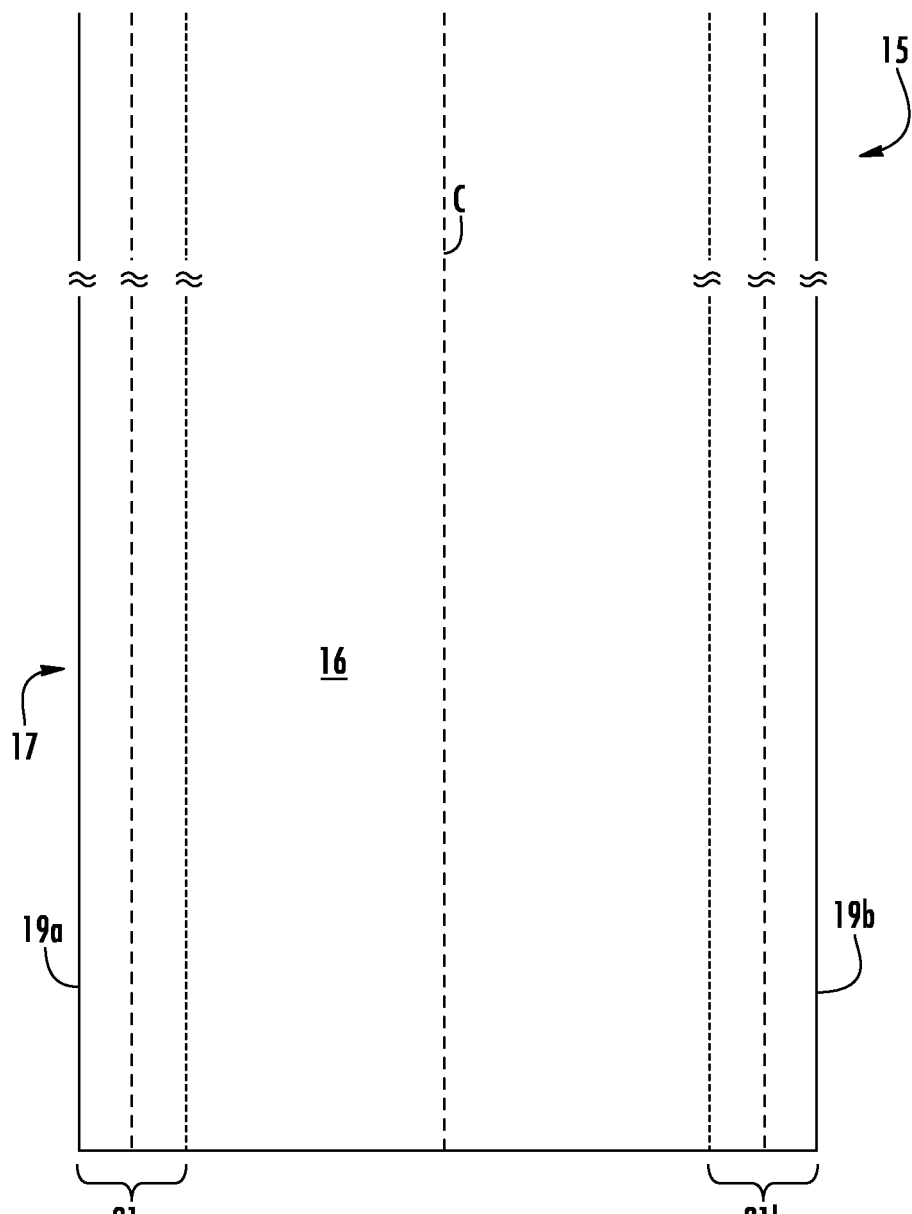
FIG. 2 illustrates an embodiment of a glass ribbon.

Referring briefly to FIG. 2, nomenclature used herein to describe the glass ribbon 15 is shown. The glass ribbon 15 has relatively broad surfaces 16 and 17, relatively narrow outer edges 19a, 19b, a centerline C, and bead portions 21a, 21b, which extend inward from edges 19a, 19b towards the centerline C. The bead portions 21a and 21b are generally thicker than a center region 23 and are generally referred to as non-quality regions for handling the glass ribbon 15.

Figure 3:
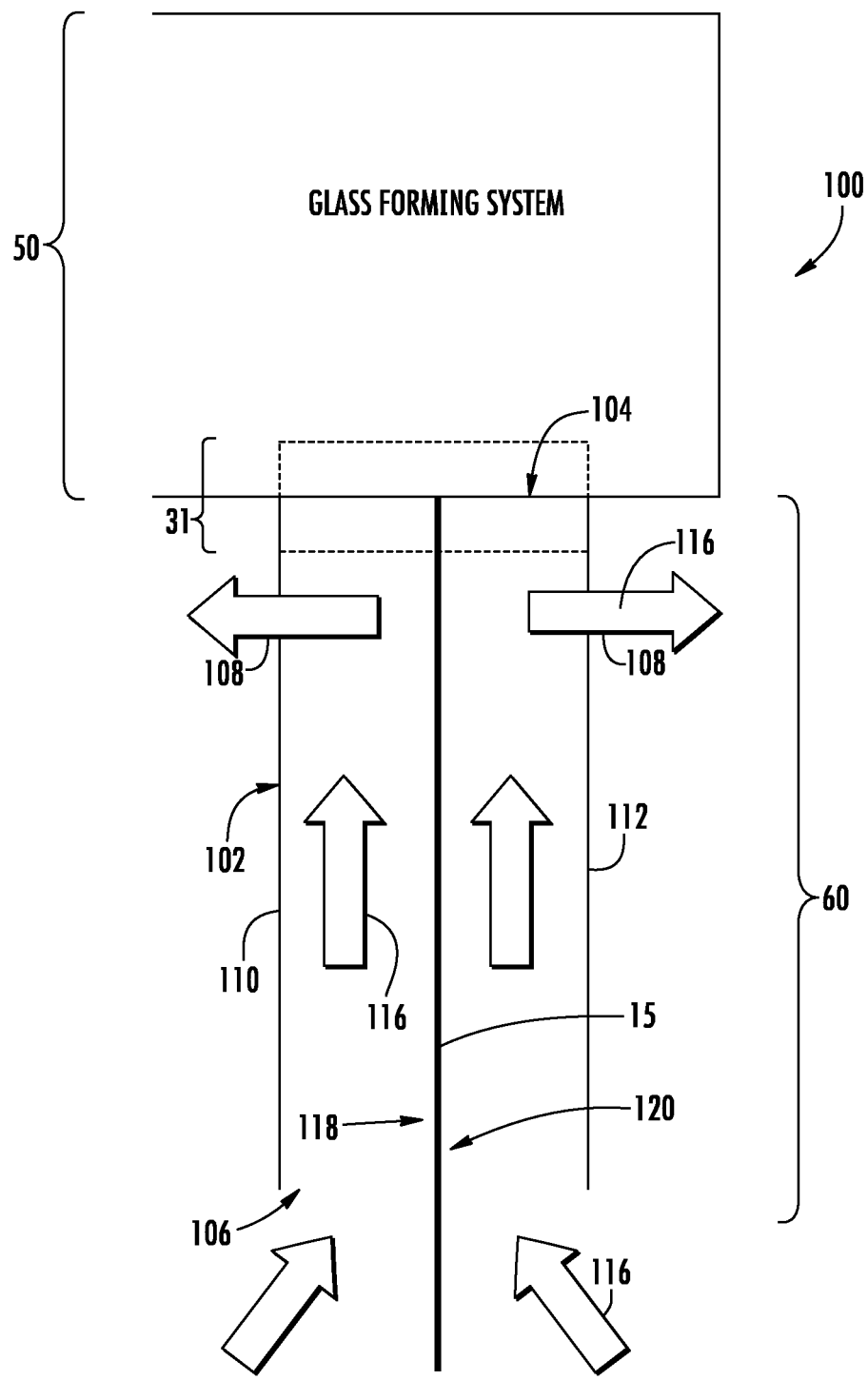
FIG. 3 is a schematic illustration of the fusion draw process of FIG. 1 including convective cooling at a location below or downstream of a glass transition temperature region.

Referring to FIG. 3, a schematic side view of a temperature control process 100 for use in cooling the glass ribbon 15 in the second section 60, below the first section 50 including the glass transition region 31 is illustrated. The glass ribbon 15 is at least partially enclosed in the protective plenum 102 after passing from the pulling rolls 29 (FIG. 1) and through the glass transition region 31. The protective plenum 102 generally vertically oriented with a top opening 104 into which the glass ribbon 15 enters the protective plenum 102 and a bottom opening 106 through which the glass ribbon 15 exits the protective plenum 102, for example, before being directed to the TAM 70. Side openings or slots 108 are provided through sidewalls 110 and 112 of the protective plenum 102 to allow air 116 or other fluid to escape from an internal volume 114 of the protective plenum 102. In some embodiments, the slots 108 may be provided at opposite sides 118 and 120 of the glass ribbon 15. This can allow air 116 to enter the internal volume 114 and travel in a vertical direction, generally parallel to an elongated length of the glass ribbon 15. As shown, the air 116 may enter through the bottom opening 106 of the protective plenum 102 through which the glass ribbon 15 exits and travels toward the TAM 70 (FIG. 1). However, other embodiments are possible. For example, the air 116 may enter through an opening or slot formed in the sidewalls 110 and 112.

Figure 4:
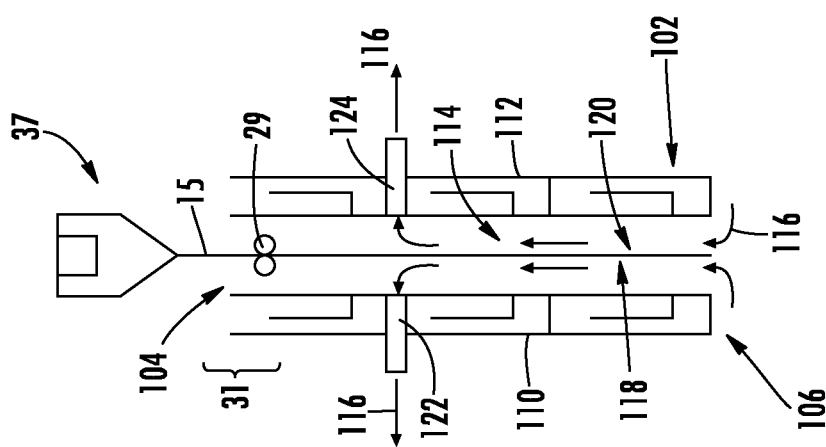
FIG. 4 illustrates an embodiment of a system and process for employing convective cooling of a glass ribbon at a location below or downstream of a glass transition temperature region.
Figure 5:
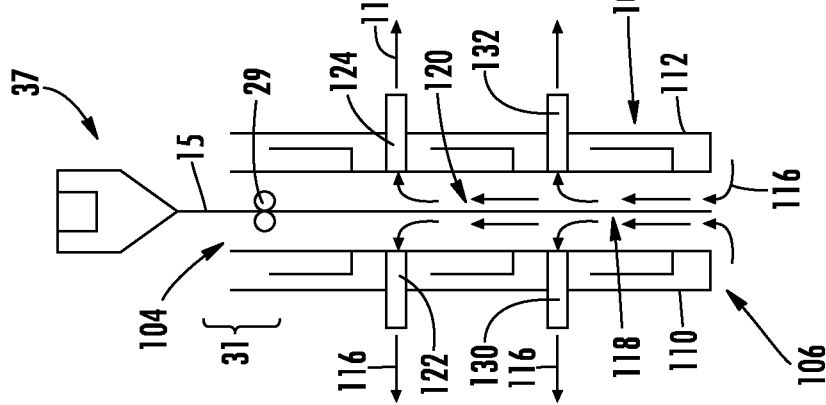
FIG. 5 illustrates another embodiment of a system and process for employing convective cooling of a glass ribbon at a location below or downstream of a glass transition temperature region.
Figure 6:
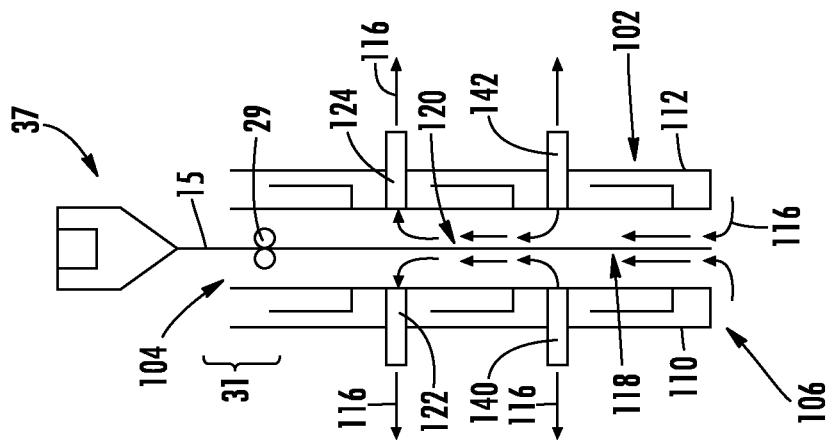
FIG. 6 illustrates another embodiment of a system and process for employing convective cooling of a glass ribbon at a location below or downstream of a glass transition temperature region.

A number of exemplary air inlet and outlet locations are illustrated by FIGS. 4-6. Referring first to FIG. 4, the isopipe 37 is illustrated forming the glass ribbon 15 from molten glass. The glass ribbon 15 is then received by the pulling rolls 29, which are located in the glass transition temperature region 31, as explained above. The glass ribbon 15 is then directed to the top opening 104 of the vertically oriented protective plenum 102 including the sidewalls 110 and 112 that form the internal volume 114 of the protective plenum 102. In the exemplary embodiment illustrated by FIG. 4, the protective plenum 102 includes an outlet slot 122 located through sidewall 110 and an outlet slot 124 located through sidewall 112. The outlet slots 122 and 124 are located on opposite sides 118 and 120 of the glass ribbon 15 and are spaced vertically from the bottom opening 106. In some embodiments, the outlet slots 122 and 124 may be spaced from the bottom opening 106 about the same vertical distance. The outlet slots 122 and 124 may also be closer to the top opening 104 than the bottom opening 106. As can be seen, a portion of the protective plenum 102 may also include at least a part of the glass transition temperature region 31. The outlet slots 122 and 124 may be located a vertical distance below the glass transition temperature region 31.

During operation, air 116 or other gas is allowed to enter through the bottom opening 106 of the protective plenum 102. The air 116 then travels vertically on both sides 118 and 120 of the glass ribbon 15, cooling the glass ribbon 15 by convection. The heated air 116 then exits the outlet slots 122 and 124 at a location below (or downstream) of the glass transition temperature region 31. In some embodiments, fans or other types of air pumps may be provided for forcing the air 116 from the internal volume 114. In other embodiments, flow may be induced by stack effect, which occurs due to the temperature difference between air inside the internal volume 114 and the outside air. An approximation of draft flow rate induced by the stack effect can be calculated with the equation presented below.

$$Q = CA\sqrt{2gh\frac{T_i - T_o}{T_i}}$$

where:
Q=stack effect draft flow rate, m³/s
A=flow area, m²
C=discharge coefficient (usually taken to be from 0.65 to 0.70)
g=gravitational acceleration, 9.81 m/s²
h=height or distance, m
$T_i$=average inside temperature, K
$T_o$=outside air temperature, K.

Referring to FIG. 5, the protective plenum 102 includes the sidewalls 110 and 112 and further includes a first pair of the outlet slots 122, 124 and a second pair of outlet slots 130, 132. The outlet slots 122 and 130 are located through sidewall 110 and the outlet slots 124 and 132 are located through sidewall 112. The outlet slots 122, 130 and 124, 132 are located on opposite sides 118 and 120 of the glass ribbon 15 with each pair of outlet slots spaced vertically from each other and spaced vertically from the bottom opening 106. In some embodiments, the first pair of outlet slots 122 and 124 may be spaced from the bottom opening 106 about the same vertical distance and the second pair of outlet slots 130 and 132 may also be spaced the same vertical distance from the bottom opening 106. The outlet slots 122 and 124 may also be closer to the top opening 104 than the bottom opening 106 and the outlet slots 130 and 132 may be closer to the bottom opening 106 than the top opening 104.

During operation, air 116 or other gas is allowed to enter through the bottom opening 106 of the protective plenum 102. The air 116 then travels vertically on both sides 118 and 120 of the glass ribbon 15, cooling the glass ribbon 15 by convection. The heated air 116 then exits the outlet slots 130, 132 and the outlet slots 122, 124 at a location below (or downstream) of the glass transition temperature region 31. In some embodiments, fans or other types of air pumps may be provided for forcing the air 116 from the internal volume 114. In other embodiments, flow may be induced by stack effect, which occurs due to the temperature difference between air inside the internal volume 114 and the outside air.

Referring to FIG. 6, the protective plenum 102 includes the sidewalls 110 and 112 and further includes a first pair of the outlet slots 122, 124 and a second pair of inlet slots 140, 142. The slots 122 and 140 are located through sidewall 110 and the slots 124 and 142 are located through sidewall 112. The slots 122, 140 and 124, 142 are located on opposite sides 118 and 120 of the glass ribbon 15 with each pair of slots spaced vertically from each other and spaced vertically from the bottom opening 106. In some embodiments, the first pair of outlet slots 122 and 124 may be spaced from the bottom opening 106 about the same vertical distance and the second pair of inlet slots 140 and 142 may also be spaced the same vertical distance from the bottom opening 106. The outlet slots 122 and 124 may also be closer to the top opening 104 than the bottom opening 106 and the inlet slots 140 and 142 may be closer to the bottom opening 106 than the top opening 104.

During operation, air 116 or other gas is allowed to enter through the bottom opening 106 of the protective plenum 102 and through the inlet slots 140 and 142. The air 116 then travels vertically on both sides 118 and 120 of the glass ribbon 15, cooling the glass ribbon 15 by convection. The heated air 116 then exits the outlet slots 122, 124 at a location below (or downstream) of the glass transition temperature region 31. In some embodiments, fans or other types of air pumps may be provided for forcing the air 116 from the internal volume 114. In other embodiments, flow may be induced by stack effect, which occurs due to the temperature difference between air inside the internal volume 114 and the outside air. In some embodiments, transversal modulation of the air may be employed, for example, where more air is extracted at the sides of the glass ribbon than at the center of the glass ribbon or reverse to tune the air flow across the glass ribbon.

Figure 7:
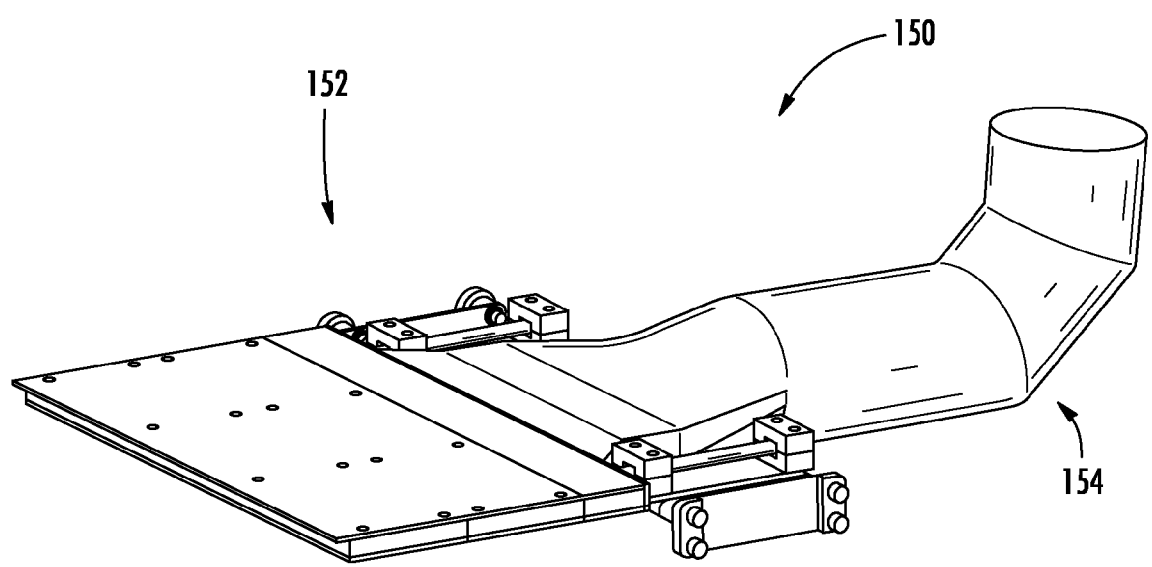
FIG. 7 illustrates an embodiment of an extracting assembly for extracting heated air during a convection cooling process.

Referring to FIG. 7, an exemplary extracting assembly 150 may be connected to the protective plenum 102 and includes a slot receiving portion 152 and a heated gas delivery portion 154. The slot receiving portion 152 may be received in one of the outlet slots and be used to extract heated air from the internal volume of the protective plenum. The heated gas delivery portion 154 may be used to direct the heated air away from the protective plenum, for example, for venting the heated air to the atmosphere.

As one example, two air outlet slots were installed through a protective plenum of a small scale fusion draw machine and on opposite sides of a glass ribbon formed using the fusion draw process. The outlet slots were located about 45 inches above a bottom opening of the protective plenum. The temperature of the glass ribbon exiting the bottom opening of the protective plenum. Two glass flow rates were tested: 210 lb/h and 375 lb/h on a 14.4 inches wide delivery system. For a glass flow of 210 lb/h, it was observed that the glass ribbon temperature was about 500° C. at 100 Nm$^3$/h (normal cubic meters per hour) extracted air flow and at 800 Nm$^3$/h the temperature was about 370° C. For a glass flow of 375 lb/h, it was observed that the glass ribbon temperature was about 640° C. at 100 Nm$^3$/h extracted air flow and at 400 Nm$^3$/h the temperature was about 610° C. A significant increase in total heat extraction was observed in the zone impacted by the air convection in the range of 20 percent to 50 percent increase depending on the amount of convective air.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. A method of cooling a glass ribbon formed using a fusion draw process, the method comprising:
    forming a glass ribbon using the fusion draw process, the glass ribbon, once formed, passing vertically through a glass transition temperature region;
    directing the glass ribbon through a protective plenum at least partially located in a bottom of the draw region;
    directing a gas into the protective plenum and vertically along a relatively broad surface of the glass ribbon; and
    directing the gas out of the protective plenum through at least one outlet slot formed through a sidewall of the protective plenum at no less than about 100 Nm$^3$/h.

2. The method of claim 1, wherein the step of directing the gas into the protective plenum is performed at a location below the glass transition temperature region.

3. The method of claim 1, wherein the glass transition temperature region includes at least part of the protective plenum.

4. The method of claim 3, wherein the outlet slot is located below the glass transition temperature region.

5. The method of claim 1, wherein the at least one outlet slot is a first outlet slot located facing a first relatively broad surface of the glass ribbon, the step of directing the gas out of the plenum includes directing the gas through a second outlet slot located facing a second relatively broad surface of the ribbon that is opposite the first relatively broad surface.

6. The method of claim 1, wherein the protective plenum includes a top opening and a bottom opening, the step of directing the gas into the protective plenum including gas entering through the bottom opening.

7. The method of claim 6, wherein the at least one outlet slot is located nearer the top opening than the bottom opening.

8. The method of claim 6, wherein the at least one outlet slot is located nearer the bottom opening than the top opening.

9. The method of claim 1, wherein the step of directing the gas into the protective plenum includes directing the gas through an inlet slot formed through the sidewall of the protective plenum.

10. The method of claim 1, wherein the step of directing the gas out of the protective plenum through at least one outlet slot includes directing the gas at between about 100 Nm$^3$/h and about 800 Nm$^3$/h through the at least one outlet slot.

* * * * *